Sept. 22, 1925.
J. BIERMANNS
1,554,704
PROTECTIVE SYSTEM
Filed Jan. 15, 1925
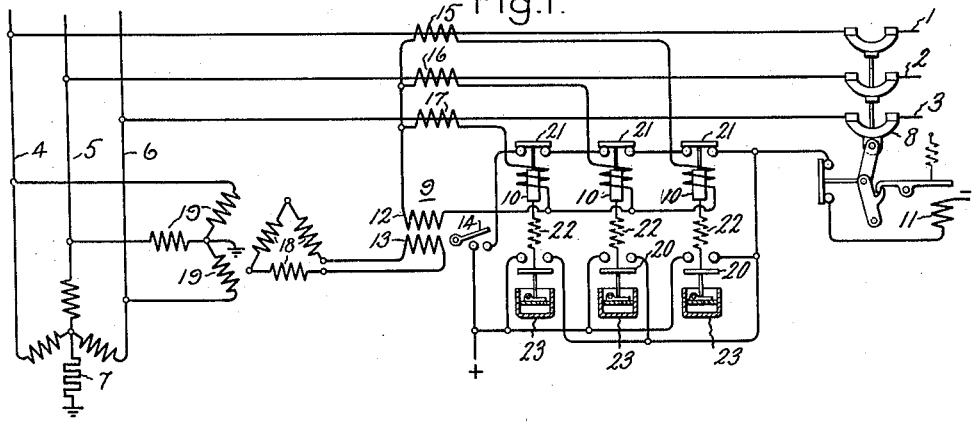
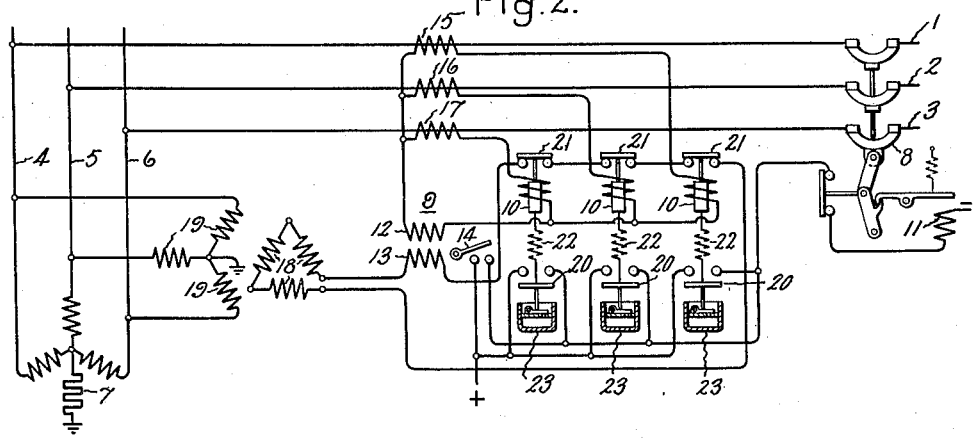
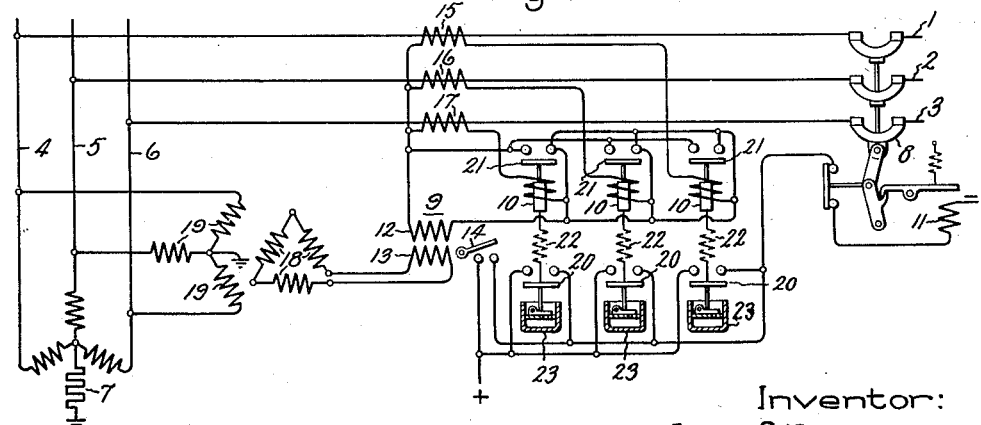
Inventor:
Josef Biermanns,
by
His Attorney.

Patented Sept. 22, 1925.

1,554,704

UNITED STATES PATENT OFFICE.

JOSEF BIERMANNS, OF KARLSHORST, GERMANY, ASSIGNOR TO GENERAL ELECTRIC COMPANY, A CORPORATION OF NEW YORK.

PROTECTIVE SYSTEM.

Application filed January 15, 1925. Serial No. 2,673.

*To all whom it may concern:*

Be it known that I, JOSEF BIERMANNS, a citizen of Germany, residing at Karlshorst, Germany, have invented certain new and useful Improvements in Protective Systems, of which the following is a specification.

My invention relates to improvements in protective systems for electric circuits and more particularly to protective systems in which relays operative in response to different kinds of faults have differing sensitivities.

In protective systems comprising relays for protection against faults involving a conductor and ground and also two or more conductors, particularly when the protected circuit is grounded through a current limiting device, the relays which are set relatively sensitively so as to operate in response to a fault between a conductor and ground also tend to operate when two or more conductors become grounded simultaneously. The protected circuit is then subjected to conditions substantially the equivalent of a fault between two conductors, that is of the nature of a short circuit, and the fault currents are much greater than is the case when only one conductor becomes grounded. Consequently, the time gradings established for the relatively sensitive ground fault relays do not appear, since these relays are then influenced by such large fault currents as to operate practically simultaneously and thereby interrupt service not only on the faulty but also on the sound portion or portions of the protected circuit. Moreover, the ground fault relays, if they be of the directional type, may deflect in the wrong direction under the action of the double ground fault and thus interrupt service on sound portions of the protected circuit. The continuity of service which is so much desired is thus disrupted.

It is, therefore, an object of my invention to provide an improved protective system wherein the ground fault relays can be given the sensitive settings and time gradings desired for faults involving one conductor and ground but will be rendered ineffective to control the protected circuit upon the occurrence of faults involving two or more conductors and wherein protection for faults involving two or more conductors is provided.

My invention will be better understood from the following description taken in connection with the accompanying drawing and its scope will be pointed out in the appended claims.

In the accompanying drawing, Fig. 1 illustrates diagrammatically a protective system embodying my invention, and Figs. 2 and 3 illustrate diagrammatically modifications of my invention.

In the several figures of the drawing, a polyphase circuit, protected in accordance with my invention and comprising conductors 1, 2, 3 connected, for example, to a station bus 4, 5, 6, which may be grounded through a neutral resistor 7, is arranged to be controlled by suitable circuit interrupting means, such as a circuit breaker 8. For controlling the circuit breaker 8 in accordance with the nature of a fault on the circuit 1, 2, 3, I provide means such as a relay 9 operative in response to a fault between one of the conductors 1, 2, 3, and ground and means such as one or more over current relays 10 operative in response to a fault between two of the conductors 1, 2, 3 to control auxiliary circuits, which include a trip coil 11 arranged when energized to effect the opening of the circuit breaker 8.

It will be understood that the line comprising the conductors 1, 2 and 3 is extended and provided with sectionalizing circuit breakers for each section. The over-current relays at the various sections are provided with different time settings, the relays most remote from a source of supply being arranged for the shortest time setting. The ground fault relays are similarly arranged with different time settings. Without the arrangement of my invention, certain fault conditions may occur which will destroy the desired selective operation of the sectionalizing switches. For example, if ground faults should occur simultaneously on two conductors of a section or different sections at points spaced from each other, the abnormal conditions would be similar to a fault between phases but would cause a heavy current to flow through the ground fault relay by reason of the difference in the impedance of the line conductors between the source and th respective ground faults. This heavy current would flow through the operating windings of all the ground fault relays of all the sections between the source and the faulty section. This current would be so much greater than that normally intended to operate the ground fault relays that the selective action of the ground fault relays would be destroyed and all sections of the line would be disconnected practically instantaneously. In accordance with my invention the over-current relays and ground fault relays are cooperatively related so that the desired selective action is always obtained.

The ground fault relay 9 may be of any well known type, the relay shown comprising cooperating current and potential windings 12 and 13 respectively, arranged to control a circuit controlling member 14. The current winding 12 is connected in the return or residual circuit of the parallel connected secondary windings of a plurality of current transformers 15, 16, 17 to be energized in accordance with the sum of the currents in the conductors 1, 2 and 3. The sum of the currents normally being zero, that is when there is no leakage or current to ground, the winding 12 is normally deenergized and becomes energized only upon the occurrence of a leakage current due, for example, to a fault to ground on one or more of the conductors 1, 2, 3. The potential coil 13 may be connected across the open delta connected secondary windings 18 of a star-delta connected auxiliary potential transformer having its primary windings 19 connected to the bus 4, 5, 6.

In order to render the ground fault relay 9 ineffectvie to control the circuit breaker 8 upon the occurrence of a fault involving two or more of the conductors 1, 2, 3 and yet control the circuit breaker 8 with a suitable time delay, the over-current relays 10 are provided with a plurality of circuit controlling members 20 and 21. These members are suitably arranged so that upon energization of the relay 10 one of the members 21 is actuated substantially instantaneously while the other member 20 is actuated after a suitable time interval. This may be accomplished by interconnecting the members 20 and 21 by resilient means such as a spring 22 and providing retarding means such as a dash pot 23. The circuit controlling members 20 are thus movable with a time delay and are arranged to control contacts connected in parallel in an auxiliary circuit comprising the trip coil 11. The circuit controlling members 21, however, are movable substantially instantaneously to render the relay 9 ineffective to control the circuit breaker 8 when one or more of the relays 10 are energized. This may be accomplished in various ways as for example in Fig. 1 where the circuit controlling members 21 are arranged to control normally closed contacts in one of the auxiliary or trip coil circuits and in series with the contacts controlled by the circuit controlling member 14 of the relay 9. Consequently, upon the occurrence of a fault involving two or more of the conductors 1, 2 and 3, one or more of the over current relays 10 will be energized and thus open the trip coil circuit controlled by the relay 9 but will subsequently complete the trip coil circuit controlled by the circuit controlling members 20.

In Fig. 2, the circuit controlling members 21 are arranged to control normally closed contacts in series with the potential coil 13 of the relay 9. Consequently upon the energization of any one of the relays 10, the circuit of the potential coil 13 is opened and the relay 9 cannot operate to complete the auxiliary or trip coil circuit controlled by its circuits controlling member 14.

In Fig. 3, the circuit controlling members 21 are arranged upon the occurrence of a fault between two or more of the conductors 1, 2, 3 to short circuit the current coil 12 of the relay 9 and thus shunt or by-pass this coil so that, even though there be leakage or residual current, the relay 9 cannot operate to control its circuit controlling member 14. The auxiliary or trip coil circuit controlled by the member 14 thus remains deenergized.

Consequently in each case, a fault involving two or more of the conductors 1, 2, 3 results in energizing one or more of the over-current relays 10 which operate to render the ground fault relay 9 ineffective to control the circuit breaker 8 but the relays 10 subsequently effect the opening of the circuit breaker. Upon the occurrence of a fault between one of the conductors 1, 2, 3 and ground, however, the relay 9 operates to effect the opening of the circuit breaker 8. Therefore, since the relay 9 is effective in case of faults between one conductor and ground but is rendered ineffective upon the occurrence of a fault involving two or more conductors, it may be given as sensitive a setting and time action as desired without causing unnecessary interruptions in the case of more severe faults involving two conductors to ground.

While I have shown and described several embodiments of my invention, I do not desire to be limited to the exact arrangements shown and described, but seek to cover in the appended claims all those modifications that fall within the true spirit and scope of my invention.

What I claim as new and desire to secure by Letters Patent of the United States is:—

1. A protective system for an electric circuit comprising means for interrupting the circuit, relay means operative in response to a fault to ground on one of the conductors of said circuit to control the opening of said interrupting means, and means operative in response to a fault between two of the conductors of said circuit to render said relay means ineffective to control said interrupting means.

2. A protective system for an electric circuit comprising means for interrupting the circuit, a relay connected to respond to a fault to ground on said circuit and arranged to control said interrupting means, and an overcurrent relay arranged on the occurrence of a fault between two of the conductors of said circuit substantially instantaneously to render the ground fault relay ineffective to control said interrupting means and to control the operating of said interrupting means with a time delay.

3. A protective system for an electric circuit comprising means for interrupting the circuit, a relay connected to respond to a fault to ground on said circuit and arranged to control the opening of said interrupting means, and an over-current relay connected to respond upon the occurrence of a fault between two of the conductors of said circuit and comprising means arranged to be moved substantially instantaneously to render said ground fault relay ineffective to control said interrupting means and means operative with a time delay to effect the opening of said interrupting means.

4. A protective system for an electric circuit comprising means for interrupting the circuit, means comprising a relay having a current winding connected to be energized in accordance with the sum of the currents in the conductors of said circuit operative in response to a fault to ground on said circuit to control the opening of said interrupting means, and a relay connected to be energized in accordance with the current in one of the conductors of said circuit operative in response to a fault between said conductor and another conductor of the circuit substantially instantaneously to render the ground fault relay ineffective to control said interrupting means and to control the opening of said interrupting means with a time delay.

5. A protective system for an electric circuit comprising means for interrupting the circuit, means comprising a plurality of auxiliary circuits for controlling said interrupting means, a relay connected to respond to a fault to ground on said circuit and comprising a movable circuit controlling member arranged to control one of said auxiliary circuits, and an overcurrent relay comprising a plurality of circuit controlling members movable in response to a fault between two of the conductors of said circuit, one of said members being arranged substantially instantaneously to open said one auxiliary circuit whereby to render said ground fault relay ineffective to control said interrupting means and another of said members being arranged to control another of said auxiliary circuits with a time delay.

In witness whereof, I have hereunto set my hand this 22nd day of December, 1924.

JOSEF BIERMANNS.